US011344866B2

(12) United States Patent
Humblot

(10) Patent No.: US 11,344,866 B2
(45) Date of Patent: May 31, 2022

(54) METHOD FOR ACTIVATING HYDROTREATING CATALYSTS

(71) Applicant: Arkema France, Colombes (FR)

(72) Inventor: Francis Humblot, Lanneplaa (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/318,919

(22) PCT Filed: Jun. 15, 2015

(86) PCT No.: PCT/FR2015/051576
§ 371 (c)(1),
(2) Date: Dec. 14, 2016

(87) PCT Pub. No.: WO2015/193598
PCT Pub. Date: Dec. 23, 2015

(65) Prior Publication Data
US 2017/0120230 A1 May 4, 2017

(30) Foreign Application Priority Data

Jun. 18, 2014 (FR) ........................................ 1455590

(51) Int. Cl.
| | | |
|---|---|---|
| *B01J 27/24* | (2006.01) | |
| *B01J 37/20* | (2006.01) | |
| *B01J 33/00* | (2006.01) | |
| *B01J 29/035* | (2006.01) | |
| *B01J 37/08* | (2006.01) | |
| *B01J 23/888* | (2006.01) | |
| *C10G 47/02* | (2006.01) | |
| *B01J 21/04* | (2006.01) | |
| *B01J 27/051* | (2006.01) | |
| *B01J 35/00* | (2006.01) | |
| *B01J 37/02* | (2006.01) | |
| *C10G 45/08* | (2006.01) | |
| *C10G 45/38* | (2006.01) | |
| *C10G 45/50* | (2006.01) | |
| *C10G 45/60* | (2006.01) | |
| *C10G 47/06* | (2006.01) | |
| *B01J 23/847* | (2006.01) | |
| *B01J 23/883* | (2006.01) | |
| *B01J 38/66* | (2006.01) | |
| *B01J 38/08* | (2006.01) | |
| *B01J 23/755* | (2006.01) | |
| *B01J 23/882* | (2006.01) | |

(52) U.S. Cl.
CPC ............. *B01J 27/24* (2013.01); *B01J 21/04* (2013.01); *B01J 23/888* (2013.01); *B01J 27/0515* (2013.01); *B01J 29/0356* (2013.01); *B01J 29/0358* (2013.01); *B01J 33/00* (2013.01); *B01J 35/0006* (2013.01); *B01J 37/0217* (2013.01); *B01J 37/08* (2013.01); *B01J 37/20* (2013.01); *C10G 45/08* (2013.01); *C10G 45/38* (2013.01); *C10G 45/50* (2013.01); *C10G 45/60* (2013.01); *C10G 47/02* (2013.01); *C10G 47/06* (2013.01); *B01J 23/755* (2013.01); *B01J 23/8472* (2013.01); *B01J 23/882* (2013.01); *B01J 23/883* (2013.01); *B01J 38/08* (2013.01); *B01J 38/66* (2013.01); *B01J 2229/38* (2013.01); *C10G 2300/703* (2013.01)

(58) Field of Classification Search
CPC ........ B01J 27/24; B01J 21/04; B01J 27/0515; B01J 33/00; B01J 35/0006; C01G 45/08; C01G 45/38; C10G 47/06
See application file for complete search history.

(56) References Cited

U.S. PATENT DOCUMENTS

| | | | | |
|---|---|---|---|---|
| 4,977,117 | A * | 12/1990 | Berrebi | ............... B01J 37/20 208/216 R |
| 6,093,309 | A | 7/2000 | Seamans et al. | |
| 6,329,314 | B1 | 12/2001 | Mignard et al. | |
| 6,402,938 | B1 | 6/2002 | Benazzi et al. | |
| 9,943,835 | B2 * | 4/2018 | Dufresne | ............... B01J 37/20 |
| 2002/0013223 | A1 | 1/2002 | Eijsbouts et al. | |
| 2009/0308790 | A1 * | 12/2009 | Gao | ............... B01J 23/85 208/108 |
| 2014/0042057 | A1 * | 2/2014 | Dufresne | ............... B01J 37/20 208/111.01 |

FOREIGN PATENT DOCUMENTS

| | | |
|---|---|---|
| ER | 2695675 A2 | 2/2014 |
| FR | 0335754 * | 10/1989 |

(Continued)

OTHER PUBLICATIONS

International Search Report and Written Opinion for International Application No. PCT/FR2015/051576, dated Sep. 24, 2015, 9 Pages.

(Continued)

*Primary Examiner* — Melissa S Swain
(74) *Attorney, Agent, or Firm* — RatnerPrestia

(57) ABSTRACT

The present invention relates to the use, in a method for in-situ activation of at least one hydrotreating, in particular hydrocracking, catalyst, of at least one nitrogen compound having at least one of the following characteristics:
a) a nitrogen content by weight in the range from 15 to 35 wt %, relative to the total weight of the nitrogen compound;
b) a number of nitrogen atoms in the range from 2 to 20;
c) a boiling point in the range from 140° C. to 300° C.; and
d) said nitrogen compound being in liquid form at room temperature and atmospheric pressure.
The present invention also relates to the method for in-situ activation of at least one hydrotreating catalyst comprising at least one step of sulphiding said hydrotreating catalyst in the presence of a sulphiding agent, and a step of passivation of said hydrotreating catalyst in the presence of said at least one nitrogen compound.

15 Claims, No Drawings

(56) References Cited

FOREIGN PATENT DOCUMENTS

| FR | 2668951 | * | 5/1992 |
| FR | 2668951 | A1 | 5/1992 |
| FR | 2778349 | A1 | 11/1999 |
| FR | 2695675 | * | 2/2014 |
| JP | 2003500187 | A | 1/2003 |
| WO | 2014001633 | A1 | 1/2014 |

OTHER PUBLICATIONS

Korean Notification of Reason for Refusal for Korean Application No. 10-2016-7037037, dated Apr. 21, 2021, 7 pages.

* cited by examiner

METHOD FOR ACTIVATING HYDROTREATING CATALYSTS

CROSS-REFERENCE TO RELATED APPLICATIONS

This is the national phase of International Application No. PCT/FR2015/051576, filed 15 Jun. 2015, which claims priority to French Application No. 1455590, filed 18 Jun. 2014. The disclosure of each of these applications is incorporated herein by reference in its entirety for all purposes.

FIELD OF THE INVENTION

The present invention relates to hydrotreating reactions. Notably it relates to the hydrotreating reactions employed during the hydrocracking of petroleum cuts and during the transformation of biomass. The present invention therefore relates both to the field of petroleum refining and to the field of the production of biofuels, in which activation of hydrotreating catalysts is carried out. More particularly, it relates to the activation of catalysts employed during these hydrotreating operations, designated below as "hydrotreating catalyst(s)". Even more specifically, the invention relates to a method for in-situ activation of hydrotreating catalysts and to the use of specific nitrogen compounds during said method for controlling the activity of the hydrotreating catalysts.

TECHNOLOGICAL BACKGROUND

Hydrotreating is a process that makes it possible, by treatment with hydrogen, notably to reduce the quantity of compounds such as sulphide compounds, nitrogen compounds, oxygenated compounds or of metals, present in a product or a mixture of products. This hydrotreating process is used in numerous fields and particularly in the field of petroleum refining for purifying petroleum cuts, but also in the field of the production of biofuels.

Among the biofuels, a distinction is made between those said to be of first generation, for example ethanol obtained from the fermentation of sugar plants (sugar beet, sugar cane, etc.) or from enzymatic hydrolysis of the starch of cereals (maize, wheat, etc.), and the biodiesel obtained by transesterification of vegetable oils using methanol. Generally, these processes that are familiar to a person skilled in the art do not use hydrogen and do not employ hydrotreating processes.

The development of these first-generation biofuels has created controversy notably because of their origins. In fact, the raw materials required for these biofuels involve intensive crop growing which will compete with agricultural production for food purposes. To overcome this problem, considerable research effort has been deployed for developing second-generation biofuels, in order to utilize other natural raw materials such as non-food vegetable oils, waste vegetable or animal oils, such as used frying oil, animal fats, and others.

Among these second-generation biofuels, some are obtained from lignocellulosic biomass such as wood, straw, agricultural waste, forestry residues or else dedicated species such as Miscanthus (elephant grass), or switchgrass. This lignocellulosic biomass is transformed by pyrolysis at high temperature, for example between 400° C. and 700° C. At this temperature, the constituent elements of the biomass such as cellulose, lignin and hemicellulose will depolymerize, and break up into lighter molecules, which will evaporate. On cooling, the vapours condense to form a liquid product called pyrolysis oil, which is mainly composed of water, phenols, ketones, aldehydes, alcohols, carboxylic acids, and carbohydrates.

The use of pyrolysis oil or other compounds of natural origin comprising aliphatic chains as precursors of biofuels most often requires transformations and purifications. In fact, all these natural compounds have high concentrations of impurities, for example the oxygenated compounds and structures incompatible with direct use as fuel. Moreover, pyrolysis oil is chemically unstable and this instability increases with the temperature, which is a real problem for a fuel.

These compounds of natural origin such as pyrolysis oil are thus improved using additional processes disclosed in the prior art, and more particularly hydrotreating processes.

Hydrotreating is not restricted to the field of biofuels, this process is also used in numerous other fields, and quite particularly in the refinery field, and more particularly during the transformation (so-called "cracking") of heavy cuts into light fractions. In fact, during petroleum refining, cracking is an operation that consists of transforming complex organic molecules into compounds of lower molecular weights. Various techniques may be employed, which include in particular catalytic cracking and hydrocracking.

Catalytic cracking is an endothermic reaction mainly for producing fuels (such as gasolines and gas oil) and light olefins (for example propylene, butylene, and others). This process consists essentially of cracking hydrocarbons at high temperature, for example from 450° C. to 550° C., at a pressure close to atmospheric pressure, for example from 1 to 5 bar (i.e. from $1 \cdot 10^5$ Pa to $5 \cdot 10^5$ Pa), and is accompanied by formation of carbon, which is deposited on the catalyst. The latter is in motion in the fluidized-bed unit so as to be regenerated continuously by combustion of the carbon by the air.

Hydrocracking mainly allows gas oil, kerosene and gasoline to be obtained. This process consists essentially of cracking hydrocarbons at lower temperature, for example from 250° C. to 450° C., under high hydrogen pressure, for example from 50 to 200 bar (or from $50 \cdot 10^5$ to $200 \cdot 10^5$ Pa). This reaction is accompanied by other reactions of hydrogenation of unsaturated compounds and/or of impurities, such as sulphide and nitrogen for example. These hydrogenated impurities can easily be separated from the hydrocarbon cuts, which then meet the specifications for commercial fuels. In particular, hydrocracking is carried out in the presence of a catalyst, in a fixed bed, which necessitates stopping the process periodically to reactivate the catalyst by sulphiding of the latter.

The present invention thus relates to hydrocracking, and not to catalytic cracking.

The term "hydrotreating", as used in the present description, describes a catalytic process of hydrogenation of a feed under pressure in order to produce fuels, especially purified fuels. This term comprises both the term "hydrocracking", which involves both the usual reactions aiming, with hydrogen, to break bonds between heteroatoms (mainly oxygen, nitrogen and sulphide) and carbon atoms, and reactions of cracking and isomerization of carbon-carbon bonds in order to reduce the chain length and obtain a more branched skeleton.

These two processes employ common catalysts. Thus, hereinafter, the term hydrotreating notably comprises the terms hydrogenation, hydroisomerization, hydrodenitrogenation, hydrodesulphurization, hydrodeoxygenation, dearomatization, hydroconversion, in particular hydrocracking and more particularly all reactions that involve hydrogen.

During the operation of activation or reactivation of the hydrotreating catalyst, especially hydrocracking catalyst, if nothing is done to inhibit the cracking reaction, reaction runaway may develop owing to the strongly exothermic nature of this reaction. This may result in loss of activity and deterioration of the catalyst, or even damage to industrial equipment. This phenomenon may also occur during the production of biofuels, more particularly of biofuels obtained from lignocellulosic biomass.

A known way of avoiding this problem is to use a nitrogen compound, generally ammonia or aniline, aniline then being used as an ammonia precursor. In fact, ammonia, introduced or generated in situ, passivates the catalyst by reacting with its acid sites that are responsible for its activity of hydrotreating, in particular of hydrocracking, called hydrotreating activity or hydrocracking activity, respectively. Once these acid sites have thus been deactivated, the reaction of hydrotreating, in particular of hydrocracking is inhibited and sulphiding of the catalyst may take place in complete safety.

Sulphiding consists of bringing a sulphiding agent, for example hydrogen sulphide or a precursor of hydrogen sulphide, into contact with the hydrotreating, in particular hydrocracking, catalyst. When sulphiding is carried out under hydrogen at high temperature, this results in complete transformation of the metals present in the catalyst to metal sulphides. The hydrotreating, in particular hydrocracking, catalyst is then activated.

Activation of hydrotreating, in particular hydrocracking, catalysts is carried out either ex situ, outside the hydrotreating, in particular hydrocracking, reactor, or in situ, inside the hydrotreating, in particular hydrocracking, reactor. These two methods are known by a person skilled in the art.

During the ex-situ process, carried out in a moving bed, a sulphiding agent is brought into contact with the catalyst. The catalyst is optionally treated thermally in the absence or in the presence of hydrogen at a pressure equal to or close to atmospheric pressure. Thus, the catalyst is presulphurized or presulphurized and activated, respectively.

Moreover, to control the hydrotreating, in particular hydrocracking, activity, of the hydrotreating, in particular hydrocracking, catalyst respectively, a nitrogen compound is generally brought into contact, ex situ, with the hydrotreating, in particular hydrocracking, catalyst, respectively. The catalyst obtained is generally dried ex situ. Generally, the hydrotreating, in particular hydrocracking, catalyst is not ready to be used as it is, and it may be desirable, or even necessary, to passivate the catalyst, most often in situ, under high hydrogen pressure and at high temperature.

During this in-situ process, usually carried out in a fixed bed, a sulphiding agent is introduced into the hydrotreating, in particular hydrocracking, reactor under high hydrogen pressure and at high temperature. This sulphiding step then allows the catalyst to be activated.

Moreover, a nitrogen compound is introduced into the hydrotreating, in particular hydrocracking, reactor under high hydrogen pressure and at high temperature, thus allowing passivation of the acid sites of the hydrotreating, in particular hydrocracking, catalyst.

Such processes are familiar to a person skilled in the art and are widely described in the scientific literature and in patents. Thus, international application WO 2014/001633 describes a process for hydroconversion of wood byproducts to biofuels that comprises a hydrotreating step and an isomerization step. This last-mentioned step uses metal catalysts supported on molecular sieves or zeolites.

Document US2009/0308790 describes a hydrogenation catalyst and a method for preparing this catalyst ex situ in the presence of an organonitrogen compound, a sulphiding agent and an organic solvent. The organonitrogen compounds of document US2009/0308790 preferably comprise nitrogen and oxygen simultaneously.

Patent application FR2778349 describes a method for activating hydroconversion catalysts, using at least one sulphide compound and at least one nitrogen compound.

Document FR2668951 describes two methods for activation of hydrocracking catalysts, one in situ and the other ex situ, comprising a step of passivation of the acid sites of the catalysts. According to this document, this step may be carried out in the presence of a nitrogen compound selected from primary, secondary or tertiary amines, compounds containing a quaternary ammonium, arylamines such as the compounds of the aniline family, pyrroles and homologues thereof, pyridines, nitriles, ureas and thio-ureas, nitrated, nitrous or nitroso derivatives, or any other basic compound or compound that can be converted into a basic compound, notably ammonia, under hydrogen pressure, at high temperature and in the presence of a catalyst.

These nitrogen compounds do not, however, offer a good compromise in terms of controlling the risk of operator exposure, and constraints relating to manipulation and storage, odor and effectiveness of inhibition of the catalyst while not adversely affecting the catalyst activity. For example, ammonia is malodorous and it requires meticulous handling; and aniline is now regarded as CMR (carcinogenic, mutagenic, reprotoxic) according to the European CLP ("Classification, Labelling, Packaging") regulations.

Moreover, the method for activating hydrotreating, in particular hydrocracking, catalysts, especially when it is carried out ex situ, presents the following disadvantages:

passivation of the catalyst under high hydrogen pressure requires an additional step in the hydrotreating, in particular hydrocracking, method, since it is generally carried out in situ before hydrotreating, in particular before hydrocracking;

the nitrogen compound and the sulphiding agent may be desorbed from the hydrotreating, in particular hydrocracking, catalyst, before the latter is fed into the hydrotreating, in particular hydrocracking, reactor;

an additional drying step is generally necessary, increasing the duration of the ex situ method;

the activity of the hydrotreating, and in particular hydrocracking, catalysts is more difficult to control because passivation is not generally carried out ex situ.

Thus, there is still a need for an improved method for in-situ activation of hydrotreating catalysts, and in particular of hydrocracking catalysts. In fact, during sulphiding of the catalysts, the reactions of cracking or of isomerization are troublesome. These reactions are very exothermic and may adversely affect the final activity of the catalyst, or even make the activation operation uncontrollable. There is in particular a need for a compound or a mixture of compounds making it possible, during activation of hydrotreating and in particular hydrocracking catalyst(s), to inhibit the activity of the catalyst temporarily but without adversely affecting its effectiveness when it is employed in hydrotreating, and in particular in hydrocracking, and which offers a good compromise in terms of controlling the risks of operator exposure, and constraints relating to handling, storage and/or odor.

DESCRIPTION OF THE INVENTION

This technical problem is solved, completely or at least partially, by the present invention. Yet other advantages will become clear from the description of the invention given hereunder.

The present invention relates to the use, in a method for in-situ activation of at least one hydrotreating, in particular hydrocracking, catalyst, of at least one nitrogen compound having at least one, preferably at least two, more preferably at least three, even more preferably at least four of the following characteristics:

a) a nitrogen content by weight in the range from 15 to 35 wt %, preferably in the range from 20 to 35%, more preferably in the range from 20 to 30%, and more advantageously in the range from 20 to 25% relative to the total weight of the nitrogen compound;

b) a number of nitrogen atoms in the range from 2 to 20, preferably in the range from 2 to 15, more preferably in the range from 2 to 10, even more preferably in the range from 2 to 5, per molecule, advantageously two nitrogen atoms per molecule;

c) a boiling point in the range from 140° C. to 300° C., preferably in the range from 140° C. to 250° C., more preferably in the range from 140° C. to 200° C., even more preferably in the range from 140° C. to 175° C.; and d) said nitrogen compound being in liquid form at room temperature and atmospheric pressure.

The invention also relates to the use of at least one nitrogen compound as defined above for controlling the activity of at least one hydrotreating catalyst, in particular of at least one hydrocracking catalyst.

The invention also relates to the use of at least one nitrogen compound as defined above for passivating the acid sites of the hydrotreating catalyst, in particular of the hydrocracking catalyst.

The invention finally relates to a method for in-situ activation of at least one hydrotreating catalyst, in particular one hydrocracking catalyst, said method comprising at least:

1) a step of sulphiding said hydrotreating, in particular hydrocracking, catalyst, in the presence of a sulphiding agent; and 2) a step of passivation of said hydrotreating, in particular hydrocracking, catalyst, in the presence of at least one nitrogen compound as defined in the present invention.

The present invention makes it possible to overcome the drawbacks of the prior art by proposing a method for activating hydrotreating catalyst(s), in particular hydrocracking catalyst(s), that is easy to use, said method being effective in terms of activation of hydrotreating catalyst(s), in particular of hydrocracking catalyst(s), and offering a good compromise in terms of controlling the risks of operator exposure, and constraints relating to handling, storage and/or odor. Advantageously, the nitrogen compound according to the invention employed in the method, carried out in situ, is not CMR (carcinogenic, mutagenic, reprotoxic) according to the European CLP regulations.

The use and the method of the present invention are quite particularly suitable for the production of biofuels derived from lignocellulosic biomass and for the hydrocracking of petroleum cuts.

Definitions

Unless stated otherwise, the percentages mentioned are percentages by weight.

"Nitrogen content by weight" means the percentage of nitrogen atoms per molecule expressed by weight relative to the total weight of the nitrogen compound.

"Room temperature" means a temperature of 20° C.

"Atmospheric pressure" means a pressure of 1.013 bar or 101325 pascal (Pa).

"Alkyl polysulphides" means all the alkyl sulphides comprising at least 2 sulphide functions per molecule.

"Dialkyl polysulphides" means all the dialkyl sulphides comprising at least 2 sulphide functions per molecule.

"Polyamine" means any amine compound comprising at least 2 amine functions, substituted or unsubstituted, per molecule.

"AAA" means the alkylalkanolamines.

"Hydrotreating activity" means the action of a catalyst for hydrotreating of compounds.

"Hydrocracking activity" means the action of a catalyst for hydrocracking of hydrocarbons.

"$T_m$" means melting point.

DETAILED DESCRIPTION OF THE INVENTION

According to a first aspect, the present invention relates to the use, in a method for in-situ activation of at least one hydrotreating, in particular hydrocracking, catalyst, of at least one nitrogen compound having at least one, preferably at least two, more preferably at least three, even more preferably at least four of the characteristics as defined above.

By using a nitrogen compound according to the invention it is possible to obtain at least one, and advantageously several, of the following advantages:

- the hydrotreating, in particular hydrocracking, activity of the hydrotreating, in particular hydrocracking, catalyst is inhibited throughout the operation of sulphiding of the latter;
- the hydrotreating, in particular hydrocracking, activity of the catalyst during the hydrotreating, in particular hydrocracking, operation is not diminished due to the action of the nitrogen compound of the invention during the operation of sulphiding of the catalyst;
- the use of a nitrogen compound according to the invention is facilitated: compared to the known nitrogen compounds generating less ammonia, the nitrogen compounds of the invention do not require heavy equipment for injection;
- the risks of exposure of the operator handling the nitrogen compound of the invention are reduced, relative to the known solutions such as those that employ aniline;
- advantageously, the nitrogen compound according to the invention is not CMR (carcinogenic, mutagenic, reprotoxic) according to the European CLP regulations.

As stated above, the nitrogen compound of the invention has at least one, preferably at least two, more preferably at least three, even more preferably at least four of the characteristics a), b), c), d) defined above. All combinations are conceivable, for example: ab, abc, ac, acd, ad, abd, bc, bcd, cd, bd, and abcd.

According to one embodiment, furthermore the nitrogen compound according to the invention has a molecular weight in the range from 80 g·mol$^{-1}$ to 300 g·mol$^{-1}$, preferably in the range from 100 g·mol$^{-1}$ to 250 g·mol$^{-1}$, even more preferably in the range from 100 g·mol$^{-1}$ to 200 g·mol$^{-1}$, advantageously in the range from 120 g·mol$^{-1}$ to 150 g·mol$^{-1}$; designated as characteristic e) hereinafter.

According to this embodiment, the nitrogen compound has, besides characteristic e), at least one, preferably at least two, more preferably at least three, even more preferably at least four of the characteristics a), b), c), d) defined above. All combinations are conceivable, for example: ae, abe, abce, ace, acde, ade, abde, be, bce, ade, bcde, cde, de, and abcde.

Advantageously, the nitrogen compounds according to the invention are selected from the nitrogen compounds comprising 2 to 20 nitrogen atoms; notably, the polyamines; the AAAs; and mixtures thereof. For example, the diamines, the triamines, and others. Preferably, the nitrogen compounds according to the invention do not comprise the compounds derived from urea as well as the nitrated, nitrous or nitroso compounds.

According to another preferred embodiment, the nitrogen compounds of the invention do not contain a functional group containing an oxygen atom, such as the hydroxyl, carboxyl, carbonyl or alkoxy group.

According to one embodiment, the nitrogen compound of the invention does not comprise an aromatic or cyclic group; designated as characteristic f) hereinafter.

According to this embodiment, the nitrogen compound has, besides characteristic f), at least one, preferably at least two, preferably at least three, preferably at least four, more preferably at least five of the characteristics a), b), c), d), e) defined above. All combinations are conceivable, for example: af, abf, abcf, abcdf, acf, acdf, acdef, adf, adef, aef, abef, abdef, acef, abef, bf, bcf, bcdf, bcdef, bdf, bdef, bef, bcef, cf, cdf, cdef, cdf, df, def, and abcdef.

According to a preferred embodiment, characteristic b) is particularly preferred. Thus, in a preferred embodiment, said at least one nitrogen compound has imperatively characteristic b), i.e. said at least one nitrogen compound has a number of nitrogen atoms in the range from 2 to 20, preferably in the range from 2 to 15, more preferably in the range from 2 to 10, even more preferably in the range from 2 to 5, per molecule, advantageously two nitrogen atoms per molecule.

According to a preferred embodiment, said at least one nitrogen compound has characteristic b) and at least one, preferably at least two, more preferably at least three, characteristics a), c), d) defined above, as well as optionally in addition characteristic e) and/or characteristic f).

Examples of nitrogen compounds that may be used in the present invention are: N,N'-diethyl-1,3-propanediamine (DEAPA) ($T_m$=−50° C.), tetramethyl-1,3-propanediamine (TMPDA) ($T_m$=−82° C.), N-methyl-1,3-propanediamine ($T_m$=−72° C.), N,N'-dibutyl-1,3-propanediamine ($T_m$=−50° C.), N-(3-dimethylaminopropyl)propane-1,3-diamine (DMAPAPA) ($T_m$=−60° C.), N-(3-aminopropyl)-1,3-propanediamine ($T_m$=−16° C.), N,N'-1,2-ethanediyl-bis-1,3-propanediamine ($T_m$=−1.5° C.), N-(aminopropyl)diethanolamine (APDEA) ($T_m$=−20° C.), and mixtures thereof.

Preferably, the nitrogen compounds are the alkylamines selected from N,N'-diethyl-1,3-propanediamine (DEAPA), tetramethyl-1,3-propanediamine (TMPDA), N-methyl-1,3-propanediamine, N,N'-dibutyl-1,3-propanediamine, N-(3-dimethylaminopropyl)propane-1,3-diamine (DMAPAPA), N-(3-aminopropyl)-1,3-propanediamine, N,N'-1,2-ethanediyl-bis-1,3-propanediamine, and mixtures thereof.

More preferably, the nitrogen compounds are selected from N,N'-diethyl-1,3-propanediamine (DEAPA) and tetramethyl-1,3-propanediamine (TMPDA), and the mixture of DEAPA and TMPDA.

According to one embodiment, a mixture of at least two nitrogen compounds is used. In the mixture of two nitrogen compounds, the nitrogen content by weight in the mixture is equivalent to the content of a single nitrogen compound as defined above. In other words, this content is from 15 to 35 wt %, preferably from 20 to 35%, more preferably from 20 to 30%, and more advantageously from 20 to 25% relative to the total weight of the mixture of nitrogen compounds.

More precisely, the following equations can be used for determining the relative amounts of nitrogen compounds to be used so that the nitrogen content by weight of the mixture complies with the invention. For a mixture of two nitrogen compounds $A_1$ and $A_2$, their relative amounts $Q_{A1}$ and $Q_{A2}$ are expressed as follows:

$$Q_{A1} = \frac{(\%\ N_{A1+A2} - \%\ N_{A2})}{(\%\ N_{A1} - \%\ N_{A2})} \times 100 \text{ and } Q_{A2} = 100 - Q_{A1}$$

In these equations:
$A_1$ and $A_2$ represent two nitrogen compounds, which may be identical or different;
$Q_{A1}$ represents the amount of the nitrogen compound $A_1$, expressed in wt % relative to the total weight of the mixture of the nitrogen compounds;
$Q_{A2}$ represents the amount of the nitrogen compound $A_2$, expressed by weight relative to the total weight of the mixture of the nitrogen compounds;
% $N_{A1}$ represents the nitrogen content by weight in the nitrogen compound $A_1$, expressed in wt % relative to the weight of the nitrogen compound $A_1$;
% $N_{A2}$ represents the nitrogen content by weight in the nitrogen compound $A_2$, expressed in wt % relative to the weight of the nitrogen compound $A_2$; and
% $N_{A1+A2}$ represents the nitrogen content by weight of the mixture of the two nitrogen compounds $A_1$ and $A_2$ according to the invention, expressed in wt % relative to the weight of the mixture.

For example, if the nitrogen content by weight in the nitrogen compound $A_1$ is % $N_{A1}$=15%, that in the nitrogen compound $A_2$ is % $N_{A2}$=30% and if, according to the present invention, the target nitrogen content by weight for the mixture of $A_1+A_2$ is % $N_{A1+A2}$=20%, then the relative amount of the nitrogen compound $A_1$ to be used in the mixture is equal to $Q_{A1}$=66.67 wt % relative to the total weight of the mixture of the nitrogen compounds and the relative amount of the nitrogen compound $A_2$ to be used in the mixture is $Q_{A2}$=33.33 wt % relative to the total weight of the mixture of the nitrogen compounds.

When the mixture comprises at least three, at least four, at least five or more than five nitrogen compounds according to the invention, equations similar to the above may be established in order to determine the relative amounts of the nitrogen compounds to be used so that the nitrogen content by weight of the mixture complies with the invention.

As stated above, the present invention finally relates to a method for in-situ activation of at least one hydrotreating, in particular hydrocracking, catalyst.

Advantageously, said method for in-situ activation of at least one hydrotreating, in particular hydrocracking, catalyst consists of:
1) a step of sulphiding said hydrotreating, in particular hydrocracking, catalyst, in the presence of a sulphiding agent; and
2) a step of passivation of said hydrotreating catalyst, in particular of said hydrocracking catalyst, in the presence of at least one nitrogen compound as defined above.

The contacting of the hydrotreating catalyst, in particular of the hydrocracking catalyst, with the nitrogen compound of the invention during said passivation step may be carried out by any method known by a person skilled in the art, in particular by liquid-phase or gas-phase injection of the nitrogen compound of the invention into the reactor comprising at least one hydrotreating catalyst, in particular at least one hydrocracking catalyst. If gas-phase injection is employed, the nitrogen compound is vaporized during injection or before injection. Preferably, liquid-phase injection is employed.

Injection of the nitrogen compound of the invention may be carried out by any means known by a person skilled in the art such as a metering pump, an injection pump, or a feed pump.

The passivation step is advantageously carried out at a temperature in the range from 120 to 350° C.

The passivation step is advantageously carried out under a hydrogen atmosphere. The hydrogen pressure corresponds to the usual operating pressure of hydrotreating, in particular hydrocracking, reactors. It is preferably in the range from 1 bar to 200 bar (or from $1 \cdot 10^5$ Pa to $200 \cdot 10^5$ Pa), preferably from 15 bar to 100 bar (or from $15 \cdot 10^5$ Pa to $100 \cdot 10^5$ Pa).

During the passivation step, the nitrogen compound is advantageously injected at a content in the range from 0.01 to 20 wt %, preferably from 0.01 to 10 wt %, more preferably from 0.01 to 5 wt % relative to the total weight of the hydrotreating, in particular hydrocracking, catalyst.

During the passivation step, the content of the nitrogen compound is advantageously adjusted so that the ammonia content generated is from 0.01 to 40 wt %, preferably from 0.01 to 20 wt %, more preferably from 0.01 to 10 wt %, even more preferably from 0.01 to 5% relative to the total weight of the hydrotreating catalyst, in particular of the hydrocracking catalyst.

The hydrotreating, in particular hydrocracking, catalyst employed in the present invention is preferably bifunctional, having an acid function and a hydrogenating function. This type of catalyst, known by a person skilled in the art, is generally in the form of a supported metal. The acid function is supplied by the support (for example alumina or amorphous and/or crystalline silico-aluminate) or by halogenated dopants, such as fluorine for example, and the hydrogenating function is supplied by metal oxides or metal sulphides, made operational by the sulphiding step.

According to one embodiment, the supports are generally porous refractory oxides. The porous refractory oxides are preferably selected from zeolites, alumina, silica, zirconia, and the beryllium, chromium, titanium, magnesium and thorium oxides, as well as combinations thereof, such as silico-aluminates and silica-titanium oxide.

The supports most used in the field of hydrotreating, in particular hydrocracking, are the crystalline silico-aluminates, called zeolites. The zeolites employed possess exchangeable cations, generally metal cations or hydronium ions, preferably hydronium ions.

The zeolites are preferably selected from the natural zeolites, for example ferrierite, the artificial and synthetic zeolites such as, non-exhaustively, the zeolites ZSM, for example ZSM-22, ZSM-23, ZSM-5, ZSM-11, ZSM-12, ZSM-23, ZSM-35, ZSM-38 and their analogues, the zeolites SAPO, for example SAPO-11, SAPO-31; zeolites beta and zeolites Y.

The porous refractory oxides may also optionally be combined with zeolites, for example the combinations of zeolites with a silica, a zirconia or an alumina.

The hydrotreating, in particular hydrocracking, catalyst used in the invention preferably comprises transition metals selected from columns 5, 6, 8, 9 and 10 of the periodic table of the elements of the IUPAC.

Preferably, the hydrotreating, in particular hydrocracking, catalyst comprises one or more transition metals selected from vanadium, niobium, tantalum, chromium, molybdenum, tungsten, iron, ruthenium, osmium, cobalt, rhodium, iridium, nickel, palladium, platinum and mixtures of two or more of them in all proportions.

The preferred combinations of metals are: nickel-tungsten, cobalt-molybdenum, nickel-vanadium, nickel-molybdenum, molybdenum-tungsten and nickel-cobalt. In particular, the nickel/tungsten catalyst has excellent isomerization and dearomatization properties, while displaying the capacity for performing reactions of hydrodeoxygenation and other hydrotreating reactions, especially hydrocracking of organic raw materials, whether they are of fossil origin (hydrocarbons derived from petroleum) or of animal or vegetable origin.

These metals are generally on a support as defined above. For the nickel/tungsten catalysts, the silico-aluminate and silica-titanium oxide supports are quite particularly suitable. These metals are in oxidized form on a support such as an alumina or an amorphous or crystalline silico-aluminate. Preferably, the metal oxides are on a zeolitic support.

The catalysts are, as nonlimiting examples, Pt/SAPO-11/Al$_2$O$_3$, Pt/ZSM-22/Al$_2$O$_3$, Pt/ZSM-23/Al$_2$O$_3$, NiW/Al$_2$O$_3$, NiW/zeolite/Al$_2$O$_3$ and Pt/SAPO-11/SiO$_2$. Preferably, the hydrotreating, in particular hydrocracking, catalyst is selected from NiW/Al$_2$O$_3$ and NiW/zeolite/Al$_2$O$_3$.

It is particularly advisable to use, jointly or mixed, hydrotreating catalysts with hydrodeoxygenation catalysts, since they both require a sulphiding step. Thus, hydrodenitrogenation, hydrodesulfurization, dearomatization, hydroconversion, hydrogenation, hydroisomerization, hydrodeoxygenation, dearomatization and hydrocracking may take place simultaneously, sequentially or alternately.

The method for in-situ activation of the hydrotreating, in particular hydrocracking, catalysts according to the invention comprises at least one sulphiding step, in which a sulphiding agent is introduced into the hydrotreating, in particular hydrocracking, reactor.

Advantageously, the sulphiding agent is selected from hydrogen sulphide, carbon disulphide, dimethyl disulphide (DMDS), dimethyl sulphide, mercaptans, thiophenes and derivatives, alkyl polysulphides, dialkyl polysulphides and all sulphide compounds capable of sulphiding the metal oxides of the hydrotreating, in particular hydrocracking, catalysts. Preferably, the sulphiding agent is DMDS, notably marketed by the company ARKEMA, for example under the trade names DMDS Evolution® and DMDS Evolution® E2.

The sulphiding step may be carried out either in the gas phase or in the liquid phase. Preferably, the sulphiding step is carried out in the liquid phase by contacting a liquid feed comprising a light cut such as kerosene or gas oil at temperatures between 120 and 350° C. at a hydrogen pressure in the range from 1 bar to 200 bar (or from $1 \cdot 10^5$ Pa to $200 \cdot 10^5$ Pa). Preferably, the hydrogen pressure is in the range from 15 bar to 100 bar (or from $15 \cdot 10^5$ Pa to $100 \cdot 10^5$ Pa).

More particularly, during the method for in-situ activation of the hydrotreating catalysts, in particular hydrocracking catalysts according to the invention, after loading at least one hydrotreating, in particular hydrocracking, catalyst, in one or more hydrotreating, in particular hydrocracking, reactors, the liquid feed is then injected at temperatures preferably from 120° C. to 350° C. The liquid feed has a sulphide content preferably between 0.01 and 20 wt % and preferably from 0.01 to 5 wt % relative to the total weight of the feed.

According to one embodiment, after loading the catalyst, and an optional step of drying between 120° C. and 200° C. with nitrogen or hydrogen to remove the water adsorbed during the loading operation, the pressure of the unit is brought to the pressure corresponding to the usual operating pressure of said unit, preferably between 1 bar and 200 bar (or between $1 \cdot 10^5$ Pa and $200 \cdot 10^5$ Pa), more preferably between 15 bar and 100 bar (or between $15 \cdot 10^5$ Pa and $100 \cdot 10^5$ Pa). The temperature of the catalytic reactors is then increased in successive stages from 200° C. to 350° C. for carrying out the reactions of sulphiding and of passivation of the hydrotreating, in particular hydrocracking, catalysts.

In the course of the sulphiding step, the sulphiding agent is injected into the liquid feed or the hydrogen that is supplied to the hydrotreating, in particular hydrocracking, reactors, according to any means known by a person skilled in the art, such as a piston-type metering pump, a multi-stage positive-displacement pump, or any other pumping system providing control of the injection flow rate.

According to a preferred embodiment, the sulphiding step and the passivation step are carried out simultaneously. In this embodiment, the sulphiding agent and the nitrogen compound are injected into the hydrotreating, in particular hydrocracking, reactor or reactors simultaneously. Mixtures comprising at least one sulphiding agent and at least one nitrogen compound as defined above are also included.

According to another embodiment, the sulphiding step and the step of passivation of the acid sites of the catalysts are carried out intermittently, i.e. in the hydrotreating, in particular hydrocracking, reactor or reactors, the sulphiding agent is injected and then at least one nitrogen compound according to the invention, or vice versa, and this operation is repeated one or more times.

According to one embodiment, after activation of the hydrotreating catalyst(s), the temperature is gradually increased in the hydrotreating reactor, to reach the usual operating temperature of the hydrotreating reactors, in so-called production mode, for example between 350° C. and 450° C. The compounds to be hydrotreated may be introduced into the hydrotreating reactor under hydrogen pressure for example in the range from 50 bar to 200 bar (or from $50 \cdot 10^5$ Pa to $200 \cdot 10^5$ Pa). The hydrogen present desorbs the ammonia from the hydrotreating catalyst, thus allowing the catalyst to regain all its hydrotreating activity for transforming the compounds derived from biomass. Advantageously, desorption is gradual, which makes it possible to control the exothermic nature of the hydrotreating reaction.

According to one embodiment, after activation of the hydrocracking catalyst(s), the temperature is gradually increased in the hydrocracking reactor, to reach the usual operating temperature of the hydrocracking reactors, in so-called production mode, preferably between 350° C. and 450° C. The fractions with heavy hydrocarbon chains to be cracked are introduced into the hydrocracking reactor under hydrogen pressure in the range from 50 bar to 200 bar (or from $50 \cdot 10^5$ Pa to $200 \cdot 10^5$ Pa). The hydrogen present desorbs the ammonia from the hydrocracking catalyst, thus allowing the catalyst to regain all its hydrocracking activity for converting the heavy fraction. Advantageously, desorption is gradual, which makes it possible to control the exothermic nature of the hydrocracking reaction.

The invention will be understood more clearly in the light of the non-limiting examples that follow, which are given for purely illustrative purposes and are not intended to limit the scope of the invention, defined by the attached claims.

EXAMPLE

The objective of this test is to compare the decomposition of amines to ammonia, on hydrotreating catalysts. The comparison is carried out between the amines according to the invention, and the amines already described in the prior art and known in the market as tri-n-butylamine and aniline.

The catalyst used for this test contains 17% by weight of molybdenum oxide and 3.5% by weight of nickel oxide supported on a y alumina. The DMDS (dimethyl disulphide) and DEAPA (diethylaminopropylamine) used in this test are supplied by the company ARKEMA.

The conversion of the amines to ammonia is obtained at the outlet of the reactor containing this catalyst. The catalyst must be activated by a "sulphurization" treatment which converts the nickel and molybdenum metal oxides into corresponding metal sulphides. A solution of dimethyl disulphide diluted to 1.5% by weight in dodecane is used as follows:

4 ml of catalyst are placed in a catalytic reactor and dried at 150° C. for 1 hour under nitrogen (10 NL/h) at 0.5 MPa, then the nitrogen is replaced with 1 NL/h of hydrogen and the pressure in the reactor is brought to 6 MPa.

4 ml/h of DMDS-doped dodecane (1.5% by weight) are introduced into the entering stream of hydrogen and the temperature of the reactor is brought to 230° C. according to a temperature ramp of 25° C./h, and then stabilized at this temperature for 6 hours, said duration being sufficient to observe a concentration of hydrogen sulphide in the hydrogen at the reactor outlet of greater than 0.5 mol %. This hydrogen sulphide concentration was measured on-line by gas chromatography.

The temperature of the reactor is then increased to 350° C. according to a ramp of 25° C./h and then kept at this temperature for at least 10 hours.

The catalyst thus activated is then brought into contact with various solutions of amines diluted in dodecane. The ammonia concentration in the hydrogen at the outlet is measured using the same gas chromatography apparatus. The test conditions were the following:

Flowrate of amine-doped dodecane (0.5% by weight of nitrogen): 4 ml/h

Hydrogen pressure: 6 MPa

Flowrate of hydrogen: 1 NL/h.

The temperature of the catalytic reactor was adjusted to between 200 and 300° C. in successive steps so as to determine the temperature required for the formation of 50% of the expected ammonia corresponding to 50% conversion of the amine into ammonia. Depending on the amine used, the following temperature values were obtained:

Aniline: 256° C.

Tri-n-butylamine: 254° C.

Diethylaminopropylamine: 245° C.

These tests show the formation of ammonia at a lower temperature by virtue of the amines of the invention, compared with the amines used in the prior art. The amine corresponding to the criteria of the invention has a greater tendency to form ammonia on contact with a nickel-based and molybdenum-based catalyst, compared with the amines normally used in the prior art.

The invention claimed is:

1. A method for in-situ activation of a hydrotreating catalyst by in situ loading, passivation and sulphiding of the hydrotreating catalyst, the method comprising:

loading at least one hydrotreating catalyst in at least one hydrotreating reactor;

passivating acid sites of the hydrotreating catalyst in the hydrotreating reactor by contacting the hydrotreating catalyst with an effective amount of at least one nitrogen compound at a temperature of 120° C. to 300° C., where the nitrogen compound is selected from the group consisting of N,N'-diethyl-1,3-propanediamine (DEAPA), tetramethyl-1,3-propanediamine (TMPDA), N-methyl-1,3-propanediamine, N,N'-dibutyl-1,3-propanediamine, N-(3-dimethylaminopropyl)propane-1,3-diamine (DMAPAPA), N-(3-aminopropyl)-1,3-propanediamine, N,N'-1,2-ethanediyl-bis-1,3-propanediamine, N-(aminopropyl)diethanolamine (APDEA), and mixtures thereof; and sulphiding the hydrotreating catalyst in the hydrotreating reactor by contacting the hydrotreating catalyst with an effective amount of a sulphiding agent to provide the in-situ activated hydrotreating catalyst.

2. The method of claim 1, wherein the nitrogen compound is selected from the group consisting of N,N'-diethyl-1,3-propanediamine (DEAPA), tetramethyl-1,3-propanediamine (TMPDA), and mixtures thereof.

3. The method of claim 1, wherein the nitrogen compound comprises N,N'-diethyl-1,3-propanediamine (DEAPA).

4. The method of claim 1, wherein the hydrotreating catalyst is a hydrocracking catalyst.

5. The method of claim 1, wherein the nitrogen compound is introduced into the hydrotreating reactor after the loading step and before the passivation step in a liquid phase or in a gas phase.

6. The method of claim 5, wherein the nitrogen compound is present in an amount ranging from 0.01 to 20 wt %, relative to the total weight of the hydrotreating catalyst.

7. The method of claim 1, wherein the sulphiding agent is selected from the group consisting of hydrogen sulphide, carbon disulphide, dimethyl disulphide (DMDS), dimethyl sulphide, mercaptans, thiophenes and derivatives, alkyl polysulphides, dialkyl polysulphides, and all sulphide compounds capable of sulphiding metal oxides of the hydrotreating catalyst.

8. The method of claim 1, wherein the sulphiding agent is introduced into the hydrotreating reactor in a liquid phase or in a gas phase after the loading step and before the sulphiding step.

9. The method of claim 1, wherein the nitrogen compound and the sulphiding agent are simultaneously introduced into the hydrotreating reactor in a liquid phase or in a gas phase after the loading step and before the passivation step and the sulphiding step.

10. The method of claim 1, wherein the nitrogen compound is introduced into the hydrotreating reactor in a liquid phase or in a gas phase after the loading step and before the passivation step and the sulphiding agent is introduced into the hydrotreating reactor in a liquid phase or in a gas phase after the loading step and before the sulphiding step.

11. The method of claim 5, wherein the nitrogen compound is introduced into the hydrotreating reactor in a liquid phase.

12. The method of claim 8, wherein the sulphiding agent is introduced into the hydrotreating reactor in a liquid phase.

13. The method of claim 10, wherein the nitrogen compound and the sulphiding agent are each introduced into the hydrotreating reactor in a liquid phase.

14. The method of claim 1, further comprising drying the hydrotreating catalyst directly after the loading step at a temperature between 120° C. and 200° C.

15. The method of claim 12, wherein the sulphiding agent is introduced into the hydrotreating reactor at a temperature ranging from 120° C. to 350° C.

* * * * *